A. SUNDH.
FLEXIBLE TUBING.
APPLICATION FILED JAN. 26, 1918.

1,295,630.

Patented Feb. 25, 1919.

Inventor
August Sundh.
By his Attorney
James G. Bethell.

UNITED STATES PATENT OFFICE.

AUGUST SUNDH, OF HASTINGS-UPON-HUDSON, NEW YORK, ASSIGNOR TO NATIONAL CLUTCH CO., INC., OF NEW YORK, N. Y., A CORPORATION OF NEW YORK.

FLEXIBLE TUBING.

1,295,630.      Specification of Letters Patent.      Patented Feb. 25, 1919.

Application filed January 26, 1918. Serial No. 213,975.

*To all whom it may concern:*

Be it known that I, AUGUST SUNDH, a citizen of the United States, resident of Hastings-upon-Hudson, in the county of Westchester and State of New York, have invented certain new and useful Improvements in Flexible Tubings, of which the following is a specification.

My invention relates to an improvement in flexible metallic fluid tight tubing. It is an object thereof to provide a flexible tubing which will be commercially practicable and capable of conveying fluids under high pressure and of withstanding rough usage without rupture or collapse, or permanent distortion, and suitable for fluid connectors between railroad cars, and other purposes.

The present structure comprises a metal strip having corrugations therein in the form of alternately inwardly and outwardly extending loops. This strip is wound spirally with its adjacent edges abutting to form other corrugations in the form of loops preferably somewhat wider than the corrugations first mentioned, to which I rigidly secure the convolutions of a wire spiral or holder. This holder which may be of any suitable cross section is stiff enough to control the metal strip so that the corrugations thereof to which it is attached will always be maintained in their proper form, and when the tubing is bent will be maintained properly spaced and proportionately flexed. In other words, the tubing is capable of conveying fluids under high pressure and will withstand rough usage without danger of rupture or collapse or permanent distortion. The holder is formed with a groove in the convolutions thereof into which the abutting edges of the strips may be forced in any suitable manner, so that they will be maintained rigidly secured thereto to form a fluid tight structure. If desired, the groove in the holder may be formed to be self-binding, or for that matter the edges of the strip may be soldered or welded in place. In other words, it is within the scope of the present invention to secure the strip to the holder in any desired manner so long as the two are rigidly joined together. The number of corrugations formed in the strip before being wound may be varied to suit various situations, and likewise the holder may be secured to the inwardly extending loops of the strip, or the outwardly extending loops as may be desired.

In the accompanying drawings, wherein are illustrated two embodiments of my invention—

Figure 1:
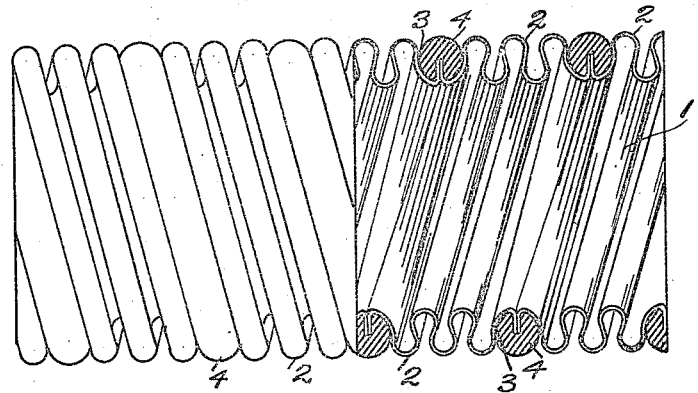
Figure 2:
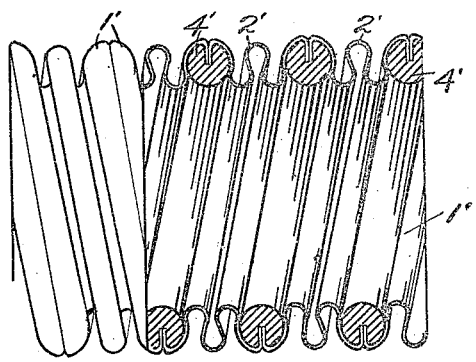

Figure 1 is a part sectional elevational view showing one form of the invention, and Fig. 2 is a part sectional elevational view of a modification.

Referring to the drawings in detail, 1 designates a metal strip having corrugations 2 formed therein, in the shape of alternately inwardly and outwardly extending loops. This strip is wound spirally with adjacent edges abutting to form other corrugations or loops 3, which are forced into a groove formed in the inner side of the convolutions of a wire spiral or holder 4, to form a rigid connection thereto and a fluid tight joint. The holder 4 is sufficiently stiff to control the movement of the strip 1. If desired, the edges of the strip may be soldered or welded to the holder or rigidly secured thereto in any other suitable manner.

It will be obvious, therefore, that the structure so far described provides a flexible fluid tight tubing controlled by the holder, so that the corrugations to which the holder is secured will be proportionately flexed, and always maintained properly spaced and in proper form. It is apparent also that the tubing will convey fluid under pressure without leakage, and without danger of rupture, collapse or permanent distortion due to external and internal pressures and rough usage.

The modification of Fig. 2 comprises a metal strip 1' having corrugations 2' formed therein, in the shape of alternately inwardly and outwardly extending loops. This strip is wound spirally with adjacent edges abutting and forced into a groove formed in the outer surface of a wire spiral or holder 4'. It will be noticed in this modification the strip is attached to the outside surface of the holder and that there are fewer corrugations in the strip between the convolutions of the holder than in Fig. 1. This structure will possess greater tensile strength than the device of Fig. 1, but the structure of Fig. 1 will be the more flexible.

I wish not to be limited to the exact details of construction illustrated and described as obviously those skilled in this art could make changes therein within the scope of this invention.

What I claim as new is:—

1. A flexible tubing comprising a spirally-wound corrugated metal strip, and a spirally wound relatively rigid member to which the strip is rigidly secured, the corrugated strip having a plurality of complete corrugations between the points of attachment of the two members to each other.

2. A flexible tubing comprising a spirally-wound corrugated metal strip, and a spiral, relatively rigid, slotted member, the adjacent edges of the corrugated strip being rigidly held in the slot of the slotted member, the corrugated member having a plurality of complete corrugations between the points of attachment of the two members to each other.

3. A flexible tubing comprising a spirally-wound corrugated metal strip, and an external spiral slotted member to which the adjacent edges of the corrugated strip are rigidly secured, the corrugated member having a plurality of complete corrugations between the points of attachment of the two members to each other.

4. A flexible tubing comprising a spirally-wound metal strip having a plurality of complete corrugations, and an external relatively rigid spiral slotted member to which the adjacent edges of the corrugated strip are rigidly secured.

5. The method of making flexible metallic tubing consisting in spirally winding a strip having a plurality of complete corrugations and rigidly securing the same to a spirally-wound relatively rigid member.

6. The method of making flexible metallic tubing consisting in corrugating a flat metal strip to form a plurality of complete corrugations and spirally winding the same to bring adjacent edges thereof together, and securing the edges to a relatively rigid spirally-wound member.

7. The method of making flexible metallic tubing consisting in spirally winding a corrugated strip having a plurality of complete corrugations, to bring adjacent edges thereof together, flanging such edges and securing the flanges to a relatively rigid spirally-wound slotted member.

8. In a flexible metallic tubing the combination of a wire spiral and a spiral of diaphragmatic material formed in a loop and rigidly attached to the wire spiral, the convolutions of the wire spiral extending in depth substantially equal to the depth of the loop of the diaphragmatic spiral.

AUGUST SUNDH.

Copies of this patent may be obtained for five cents each, by addressing the "Commissioner of Patents, Washington, D. C."